US011001710B2

(12) United States Patent
Dai et al.

(10) Patent No.: US 11,001,710 B2
(45) Date of Patent: May 11, 2021

(54) POLY(ETHERIMIDE-SILOXANE)/POLY(PHTHALAMIDE) COMPOSITIONS, ARTICLES PREPARED THEREFROM, AND METHODS FOR THE MANUFACTURE THEREOF

(71) Applicant: SABIC Global Technologies B.V, Bergen op Zoom (NL)

(72) Inventors: Mian Dai, Shanghai (CN); Liang Shen, Shanghai (CN)

(73) Assignee: SHPP GLOBAL TECHNOLOGIES B.V., Bergen op Zoom (NL)

(*) Notice: Subject to any disclaimer, the term of this patent is extended or adjusted under 35 U.S.C. 154(b) by 205 days.

(21) Appl. No.: 16/317,704

(22) PCT Filed: Jul. 10, 2017

(86) PCT No.: PCT/IB2017/054154
§ 371 (c)(1),
(2) Date: Jan. 14, 2019

(87) PCT Pub. No.: WO2018/011701
PCT Pub. Date: Jan. 18, 2018

(65) Prior Publication Data
US 2020/0181405 A1 Jun. 11, 2020

Related U.S. Application Data

(60) Provisional application No. 62/362,757, filed on Jul. 15, 2016.

(51) Int. Cl.
*C08L 77/06* (2006.01)
*C08L 79/08* (2006.01)

(52) U.S. Cl.
CPC .............. *C08L 77/06* (2013.01); *C08L 79/08* (2013.01); *C08L 2201/02* (2013.01); *C08L 2201/08* (2013.01)

(58) Field of Classification Search
CPC .......... C08L 77/00; C08L 77/02; C08L 77/04; C08L 77/06; C08L 77/08; C08L 77/10; C08L 77/12; C08L 79/08; C08L 83/04; C08L 83/06; C08L 83/08; C08L 83/10; C08L 83/12; C08L 2201/02; C08L 2201/08; C08G 73/10; C08G 73/1003; C08G 73/1007; C08G 73/1042; C08G 73/1046; C08G 73/105; C08G 73/1053; C08G 73/1057; C08G 73/106; C08G 73/1067; C08G 73/1071; C08G 73/1075; C08G 73/1078; C08G 73/1082; C08G 73/1085
See application file for complete search history.

(56) References Cited

U.S. PATENT DOCUMENTS

| | | | |
|---|---|---|---|
| 4,612,353 A | 9/1986 | Andrews et al. | |
| 4,657,987 A | 4/1987 | Rock et al. | |
| 5,013,799 A | 5/1991 | Giles, Jr. et al. | |
| 5,166,246 A | 11/1992 | Gallucci et al. | |
| 5,296,558 A | 3/1994 | Hood et al. | |
| 5,346,969 A | 9/1994 | Kaku | |
| 5,700,863 A | 12/1997 | Bloom | |
| 5,780,576 A | 7/1998 | Weber et al. | |
| 6,822,032 B2 | 11/2004 | Gallucci | |
| 8,309,637 B2 | 11/2012 | Sanner et al. | |
| 8,784,719 B2 | 7/2014 | Lingannaiah et al. | |
| 2008/0223602 A1 | 9/2008 | Gallucci et al. | |
| 2009/0234060 A1 | 9/2009 | Haralur et al. | |
| 2010/0147548 A1 | 6/2010 | Bhandari et al. | |
| 2013/0079474 A1 | 3/2013 | Ramalingam et al. | |
| 2014/0073724 A1 | 3/2014 | Zheng et al. | |
| 2014/0088230 A1* | 3/2014 | Grcev ............ C08L 77/06 524/133 |
| 2016/0152827 A1* | 6/2016 | Gallucci ......... C09D 179/08 428/337 |

FOREIGN PATENT DOCUMENTS

| | | |
|---|---|---|
| EP | 0104659 B1 | 1/1988 |
| EP | 0410514 A1 | 1/1991 |
| EP | 0637607 | 2/1995 |
| JP | 4216861 | 8/1992 |
| JP | 04216861 A * | 8/1992 |
| WO | 2016137861 A1 | 9/2016 |
| WO | 2018011701 | 1/2018 |

OTHER PUBLICATIONS

JPH04216861 English Machine Translation, prepared Sep. 30, 2020. (Year: 2020).*
International Search Report for International Application No. PCT/IB2017/054154; International Filing Date: Jul. 10, 2017; dated Oct. 20, 2017; 5 pages.
Written Opinion of the International Searching Authority for International Application No. PCT/IB2017/054154; International Filing Date: Jul. 10, 2017; dated Oct. 20, 2017; 6 pages.

* cited by examiner

Primary Examiner — Christopher M Rodd
(74) Attorney, Agent, or Firm — Cantor Colburn LLP

(57) ABSTRACT

A thermoplastic composition includes a poly(phthalamide), a poly(etherimide-siloxane), and, optionally, an additive composition. The respective amounts of each component are further described herein. A method for the manufacture of the composition includes melt-mixing the components of the composition, and optionally, extruding the composition. Articles including the thermoplastic composition are also described.

19 Claims, 2 Drawing Sheets

POLY(ETHERIMIDE-SILOXANE)/POLY(PHTHALAMIDE) COMPOSITIONS, ARTICLES PREPARED THEREFROM, AND METHODS FOR THE MANUFACTURE THEREOF

CROSS-REFERENCE TO RELATED APPLICATIONS

This application is a National Stage application of PCT/IB2017/054154, filed Jul. 10, 2017, which claims the benefit of U.S. Provisional Application No. 62/362,757 filed Jul. 15, 2016, both of which are incorporated by reference herein in their entirety.

BACKGROUND

Poly(imides), in particular poly(etherimide)s (PEI), are high performance polymers having a glass transition temperature (Tg) of greater than 180° C. These polymers have high strength, heat resistance, and modulus, and further can have broad chemical resistance. Poly(etherimide)s are widely used in applications including automotive, telecommunications, aerospace, electrical/electronics, transportation, and healthcare.

Poly(etherimide)s can include poly(etherimide-siloxane)s, including polyetherimide repeating units and siloxane blocks. The poly(etherimide) blocks can provide the desirable properties associated with poly(etherimides) as discussed above, while the poly(siloxane) blocks can contribute flexibility, improved low-temperature properties, and thermal stability to compositions including a poly(etherimide-siloxane).

There remains a need in the art for a thermoplastic composition having a desirable combination of physical properties, specifically excellent heat resistance and good ductility. Thermoplastic compositions exhibiting these properties can be particularly useful for applications including flexible displays, wearable devices, and wire/cable applications.

BRIEF DESCRIPTION

A thermoplastic composition comprises 10 to 90 wt % of poly(phthalamide); 10 to 90 wt % of a poly(etherimide-siloxane); and 0 to 10 wt % of an additive composition, wherein weight percent of each component is based on the total weight of the composition.

An article comprising the thermoplastic composition is also described.

A method for the manufacture of the thermoplastic composition comprises melt-mixing the components of the composition; and optionally, extruding the composition.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

Figure 1:
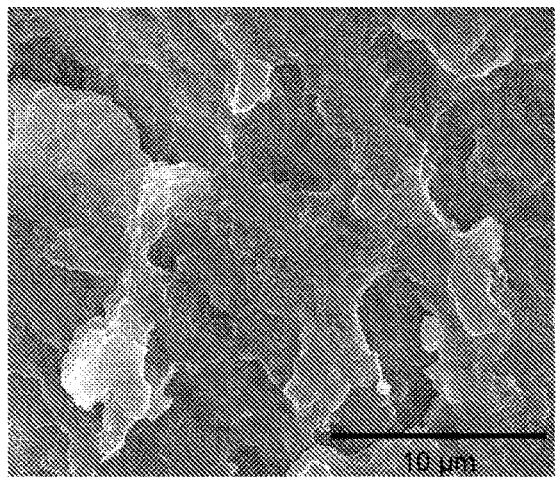
FIG. 1 is a scanning electron microscope (SEM) image of the composition of Example 1.

Described herein are poly(etherimide-siloxane)/poly(phthalamide) compositions. The present inventors have unexpectedly discovered that combining a poly(etherimide-siloxane) and a semi-aromatic poly(amide) (e.g., a poly(phthalamide)) in particular amounts, optionally in the presence of various additives, can provide a thermoplastic composition exhibiting a desirable combination of properties. For example, the compositions can have good heat resistance and good ductility. Advantageously, the compositions described herein can be useful in electrical and electronics applications, for example in flexible displays, wearable electronic devices, and wire or cable applications.

Accordingly, one aspect of the present disclosure is a thermoplastic composition comprising a poly(etherimide-siloxane). The poly(etherimide-siloxane) copolymers comprise more than 1, for example 2 to 1000, or 5 to 500, or 10 to 100 polyetherimide structural units of the formula (1)

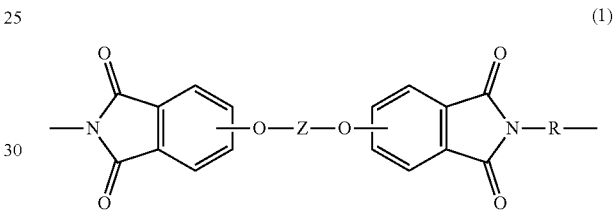

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group, in particular a halogenated derivative of any of the foregoing. In some embodiments R is divalent group of one or more of the following formulas (2)

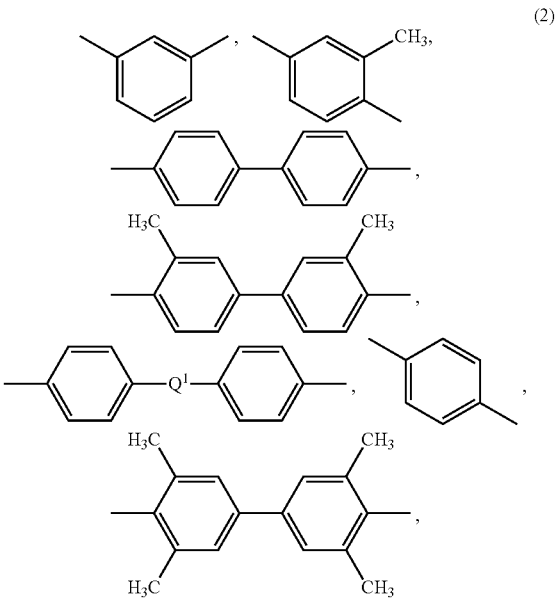

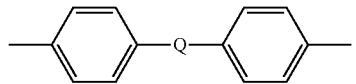

(3a)

wherein Q is —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in the above formula is 2,2-isopropylidene.

In an embodiment in formula (1), R is m-phenylene, p-phenylene, or a combination comprising at least one of the foregoing, and Z is a divalent group of formula (3a). Alternatively, R is m-phenylene, p-phenylene, or a combination comprising at least one of the foregoing, and Z is a divalent group of formula (3a) and Q is 2,2-isopropylidene. Alternatively, the poly(etherimide) can be a copolymer comprising additional structural poly(etherimide) units of formula (1) wherein at least 50 mole percent (mol %) of the R groups are bis(3,4'-phenylene)sulfone, bis(3,3'-phenylene)sulfone, or a combination comprising at least one of the foregoing and the remaining R groups are p-phenylene, m-phenylene or a combination comprising at least one of the foregoing; and Z is 2,2-(4-phenylene)isopropylidene, i.e., a bisphenol A moiety.

In some embodiments, the poly(etherimide-siloxane) optionally further comprises additional structural imide units that are not poly(etherimide) units, for example imide units of formula (4)

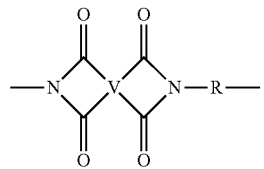

(4)

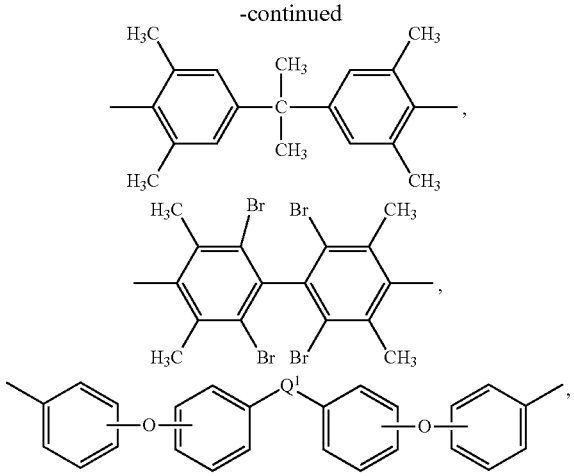

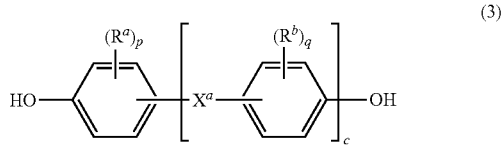

wherein Q$^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent of the R groups contain sulfone groups, and in other embodiments no R groups contain sulfone groups.

Further in formula (1), the divalent bonds of the —O—Z—O— group are in the 3,3', 3,4', 4,3', or the 4,4' positions, and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary Z groups include groups derived from a dihydroxy compound of the formula (3)

(3)

wherein R$^a$ and R$^b$ can be the same or different and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —SO$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorus. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of the formula (3a)

wherein R is as described in formula (1) and each V is the same or different, and is a substituted or unsubstituted C$_{6-20}$ aromatic hydrocarbon group, for example a tetravalent linker of the formulas

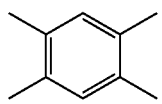 or 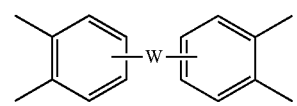

wherein W is a single bond, —O—, —S—, —C(O)—, —SO$_2$—, —SO—, a C$_{1-18}$ hydrocarbylene group, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mol % of the total number of units. In some embodiments, no additional imide units are present in the poly(etherimide).

The poly(etherimide-siloxane) can be prepared by any of the methods well known to those skilled in the art, including the reaction of an aromatic bis(ether anhydride) of the formula (5) with an organic diamine of the formula (6)

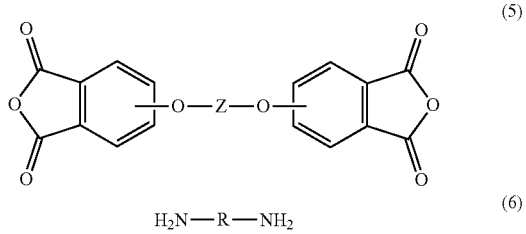

(5)

(6)

wherein Z and R are defined as described above. Copolymers of the poly(etherimide)s can be manufactured using a combination of an aromatic bis(ether anhydride) of the above formula and a different bis(anhydride).

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The poly(etherimide-siloxane) copolymer further comprises one or more siloxane blocks of the formula (7)

$$\left[\begin{array}{c} R' \\ | \\ SiO \\ | \\ R' \end{array}\right]_E$$ (7)

wherein each R' is independently a $C_{1-13}$ monovalent hydrocarbyl group and E can be 2 to 50, or 5 to 30, or 10 to 40. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R' groups can be used in the same copolymer. In an embodiment, the poly(siloxane) units comprise R' groups having minimal hydrocarbon content. In a specific embodiment, an R' group with a minimal hydrocarbon content is a methyl group.

The poly(etherimide-siloxane) copolymer can be a block or graft copolymer. Block poly(etherimide-siloxane) copolymers comprise etherimide units and siloxane blocks in the polymer backbone. The etherimide units and the siloxane blocks can be present in random order, as blocks (i.e., AABB), alternating (i.e., ABAB), or a combination thereof. Graft poly(etherimide-siloxane) copolymers are non-linear copolymers comprising the siloxane blocks connected to linear or branched polymer backbone comprising etherimide blocks.

The poly(etherimide-siloxane) copolymer can be formed by polymerization of an aromatic bis(ether anhydride) of formula (5) and a diamine component comprising an organic diamine as described above or mixture of diamines, and a poly(siloxane) diamine of the formula (8)

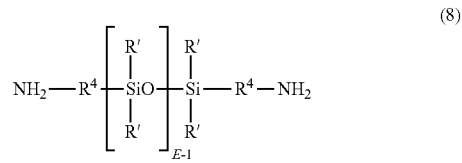

(8)

wherein R' and E are as described in formula (7), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkylene group, specifically a $C_2$-$C_{10}$ alkylene group such as propylene, and E has an average value of 5 to 100, 5 to 75, 5 to 60, 5 to 15, or 15 to 40. Procedures for making the poly(siloxane) diamines of formula (8) are known in the art.

In some poly(etherimide-siloxane) copolymers, the diamine component can contain 10 to 90 mole percent (mol %), or 20 to 50 mol %, or 25 to 40 mol % of the poly(siloxane) diamine (8) and 10 to 90 mol %, or 50 to 80 mol %, or 60 to 75 mol % of organic diamine (6). The diamine components can be physically mixed prior to reaction with the bisanhydride(s), thus forming a substantially random copolymer. Alternatively, block or alternating copolymers can be formed by selective reaction of each diamine with aromatic bisanhydride(s), to make poly(imide) blocks that are subsequently reacted together. Thus, the poly(etherimide-siloxane) copolymer can be a block, random, or graft copolymer.

Examples of specific poly(etherimide-siloxane)s are described in U.S. Pat. Nos. 4,404,350, 4,808,686 and 4,690,997. In an embodiment, the poly(etherimide-siloxane) has units of formula (9)

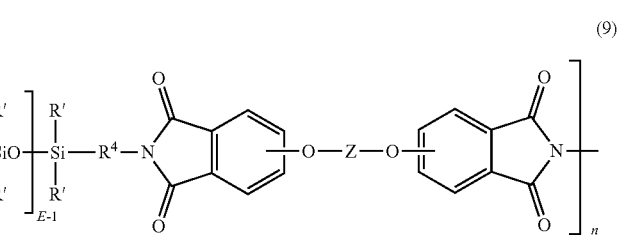

wherein R' and E of the siloxane are as in formula (7), the R and Z of the imide are as in formula (1), $R^4$ is the same as $R^4$ as in formula (8), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl.

The relative amount of poly(siloxane) units and etherimide units in the poly(etherimide-siloxane) depends on the desired properties, and are selected using the guidelines provided herein. In particular, as mentioned above, the block or graft poly(etherimide-siloxane) copolymer is selected to have a certain average value of E, and is selected and used in an amount effective to provide the desired weight percent (wt %) of poly(siloxane) units in the composition. In an embodiment the poly(etherimide-siloxane) comprises 10 to 50 wt %, 10 to 40 wt %, or 20 to 35 wt % poly(siloxane) units, based on the total weight of the poly(etherimide-siloxane).

In some embodiments, the poly(etherimide-siloxane) copolymer can have a weight average molecular weight ($M_w$) of 1,000 to 150,000 Daltons as measured by gel permeation chromatography (GPC) using polystyrene standards, and can have a poly(siloxane) content of 10 to 50 weight percent, preferably 15 to 40 weight percent, more preferably 20 to 35 weight percent. In some embodiments, the poly(etherimide-siloxane) copolymer has an $M_w$ of 5,000 to 80,000 Da, specifically, 55,000 to 75,000 Da, more specifically, 60,000 to 70,000 Da.

The poly(etherimide-siloxane) can be present in an amount of 10 to 90 wt %, for example, 40 to 60 wt %, for example, 45 to 55 wt %, wherein weight percent is based on the total weight of the composition.

In some embodiments, a poly(etherimide) other than the poly(etherimide-siloxane) is excluded from the thermoplastic composition.

In addition to the poly(etherimide-siloxane), the thermoplastic composition includes a semi-aromatic poly(amide), specifically, a poly(phthalamide). In some embodiments, the thermoplastic composition comprises a semi-aromatic poly(amide) consisting of a poly(phthalamide).

Poly(phthalamide)s are the condensation product of terephthalic acid, isophthalic acid, a derivative thereof, or a combination thereof, and a diamine. In some embodiments, the poly(phthalamide) comprises repeating units of the formula (10)

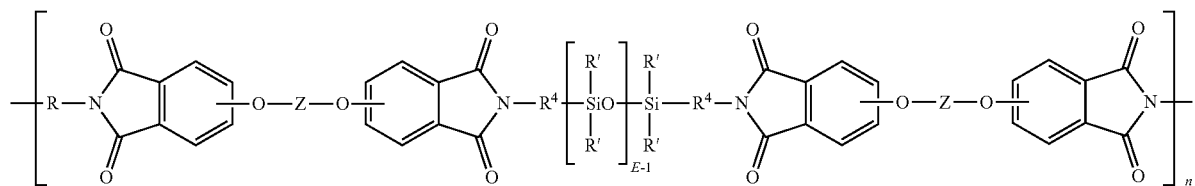

wherein $Q^2$ is independently at each occurrence a substituted or unsubstituted $C_{4-14}$ alkylene group. The poly(phthalamide) can be the reaction product of at least one $C_{4-14}$ aliphatic diamine and terephthalic acid. In some embodiments, the poly(phthalamide) can optionally further include structural units derived from isophthalic acid. In some embodiments, poly(phthalamide)s are poly(amide)s having a combined content of terephthalamide and isophthalamide units of at least 60 mole percent. In some embodiments, the poly(phthalamide) comprises 60-70 mole percent of structural units of formula (10) wherein the aromatic portion of the unit is derived from terephthalic acid, and 20-30 mole percent of structural units of formula (10) wherein the aromatic portion of the unit is derived from isophthalic acid.

$Q^2$ in formula (10) can be derived from an aliphatic diamine. For example, the aliphatic diamine can be a linear $C_{4-14}$ aliphatic diamine, a branched $C_{4-14}$ aliphatic diamine, a $C_{4-14}$ alicyclic diamine, or combination comprising at least one of the foregoing. In some embodiments, the linear diamine can include 1,4-butanediamine, 1,6-hexamethylenediamine, 1,8-octamethylenediamine, 1,9-nonamethylenediamine, 1,10-decanediamine, 1,11-undecanediamine, 1,12-dodecanediamine, or a combination comprising at least one of the foregoing. In some embodiments, the branched $C_4$-14 aliphatic diamine can include 2-methyl-1,5-pentamethylenediamine, 3-methyl-1,5-pentamethylenediamine, 2,4-dimethyl-1,6-hexamethylenediamine, 2,2,4-trimethyl-1,6-hexamethylenediamine, 2,4,4-trimethyl-1,6-hexamethylenediamine, 2-methyl-1,8-octamethylenediamine, 5-methyl-1,9-nonamethylenediamine, or a combination comprising at least one of the foregoing. In some embodiments, the $C_{4-14}$ alicyclic diamine comprises cyclohexanediamine, 4,4'-diamino dicyclohexyl methane, or a combination comprising at least one of the foregoing. Preferably, $Q^2$ is derived from a linear $C_{4-14}$ aliphatic diamine, for example, 1,9-nonamethylenediamine, 1,10-decanediamine, or a combination comprising at least one of the foregoing.

In some embodiments, the poly(phthalamide) preferably includes structural units derived from a $C_{4-12}$ linear alkyl diamine and terephthalic acid, isophthalic acid, or a combination thereof. In some embodiments, the poly(phthalamide) comprises structural units derived from a $C_{9-10}$ alkyl diamine and terephthalic acid.

The poly(phthalamide) can be a homopolymer or a copolymer, including a block copolymer or a random copolymer, and can optionally further comprise additional amide or phthalamide structural units different from those of formula (10) above. For example, in some embodiments, the poly (phthalamide) can further comprise additional repeating units derived from additional aromatic dicarboxylic acids (e.g., 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4, 4'-dicarboxylic acid, diphenylsulfone-4,4'-dicarboxylic acid, 4,4'-biphenyldicarboxylic acid and the like), aliphatic dicarboxylic acids (e.g., malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, suberic acid, undecanedioic acid and dodecanedioic acid), alicyclic dicarboxylic acids (e.g., 1,3-cyclopentanedicarboxylic acid and 1,4-cyclohexanedicarboxylic acid), or a combination comprising at least one of the foregoing additional dicarboxylic acids. When present, the content of the additional dicarboxylic acid units is generally 50 mole percent (mol %) or less, or 40 mol % or less, or 30 mol % or less, or 20 mol % or less with respect to the total moles of the dicarboxylic acid units. Furthermore, the poly(phthalamide) can comprise structural units derived from polyfunctional compounds such as trimellitic acid, trimesic acid and pyromellitic acid. In some embodiments, the poly(phthalamide) comprises no additional repeating units derived from the aforementioned additional carboxylic acids.

In some embodiments, the poly(phthalamide) can be a block copolymer or a random copolymer, and can further comprise structural units of formula (11)

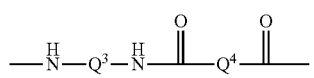

(11)

wherein $Q^3$ and $Q^4$ are independently at each occurrence a substituted or unsubstituted $C_{4-14}$ alkylene group. $Q^3$ and $Q^4$ can be the same or different alkylene group. In some embodiments, $Q^3$ can be derived from an aliphatic diamine, and can be the same or different as $Q^2$ described above. In some embodiments, $Q^4$ can be a hexylene group, for example $Q^4$ can be derived from adipic acid. In some embodiments, when present, structural units according to formula (11) can be included in a poly(phthalamide) copolymer in an amount of 50 mol % or less, or 40 mol % or less, or 30 mol % or less, or 20 mol % or less.

Poly(phthalamide)s can be prepared according to methods that are generally known. The ratio of diamine to dicarboxylic acid is typically equimolar, although excess of one or the other can be used to determine the end group functionality of the resulting poly(phthalamide). In addition, the reaction can further include monoamines and monocarboxylic acids which function as chain stoppers and can determine, at least in part, the end group functionality. Examples of suitable monofunctional amine chain stoppers can include aromatic primary amines, for example, aniline, chloroaniline, perfluoromethyl aniline, naphthyl amines, and the like. Monocarboxylic acids, i.e., aromatic groups comprising one carboxylic acid group, can also be used to control molecular weight of the poly(phthalamide)s. For example, benzoic acid can be used. Chain stoppers, when present, can be used in an amount of less than or equal to 1 mole percent, or less than or equal to 0.1 mole percent, based on the total moles of the diamine and the dicarboxylic acid.

In some embodiments, the poly(phthalamide) can optionally be combined with a poly(amide) different from the poly(phthalamide), for example an aliphatic poly(amide), and the combination can be used in the thermoplastic composition. For example, the thermoplastic composition can include the poly(phthalamide) of formula (10) and a poly(amide) of the following formula (12)

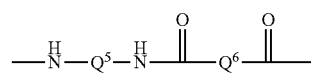

(12)

wherein $Q^5$ and $Q^6$ are independently at each occurrence a substituted or unsubstituted $C_{4-14}$ alkylene group. $Q^5$ and $Q^6$ can be the same or different alkylene group. In some embodiments, $Q^5$ and $Q^6$ are each $C_{8-12}$ alkylene groups, for example $C_{11}$ alkylene groups. An example of a suitable blend of a poly(phthalamide) and a different poly(amide) is available under the trade name RILSAN from Arkema.

In some embodiments, a poly(amide) other than the poly(phthalamide) can be excluded from the thermoplastic composition.

The poly(phthalamide) and, when present, the poly (amide) different from the poly(phthalamide)) can be present in the thermoplastic composition in a total amount of 10 to 90 wt %, or 40 to 60 wt %, or 45 to 55 wt %, based on the total weight of the thermoplastic composition.

In some embodiments, in addition to the poly(etherimidesiloxane) and the poly(phthalamide), the thermoplastic composition can optionally further include an additive composition. The additive composition can include one or more additives selected so as to not significantly adversely affect the desired properties of the thermoplastic composition. Such additives can be added to the composition at any suitable time, for example during the mixing of the components to form the composition. Additives can include fillers, reinforcing agents, antioxidants, heat stabilizers, light stabilizers, ultraviolet light stabilizers, ultraviolet light absorbing additives, plasticizers, lubricants, release agents, processing aids, antistatic agents, anti-fog agents, antimicrobial agents, colorants, surface effect additives, radiation stabilizers, flame retardants, anti-drip agents, hydrostabilizers, or a combination comprising at least one of the foregoing. Preferably, additives that can be used include, for example, an antioxidant, heat stabilizer, hydrostabilizer, ultraviolet light stabilizer, processing aid, colorant, or a combination comprising at least one of the foregoing.

The additive composition can be present in an amount of 0 to 10 wt %, preferably greater than 0 to 10 wt %, more preferably 0.1 to 5 wt %, even more preferably 0.25 to 4 wt %, most preferably 1 to 4 wt %, based on the total weight of the composition.

In a specific embodiment, the thermoplastic composition comprises 45 to 55 wt % of the poly(phthalamide); 45 to 55 wt % of the poly(etherimide-siloxane); and 1 to 4 wt % of the additive composition. Preferably, no poly(etherimide) other than the poly(etherimide-siloxane) is present in the composition.

The thermoplastic composition described herein can advantageously exhibit a desirable combination of properties.

In some embodiments, the composition can have a notched Izod impact strength of greater than or equal to 95 Joules per meter (J/m), preferably 95 to 350 J/m, more preferably 100 to 350 J/m, even more preferably 125 to 350 J/m, as determined by ASTM D256 at 23° C. at a thickness of 3.2 mm.

In some embodiments, the composition can have a heat deflection temperature of greater than or equal to 100° C., preferably 100 to 250° C., as determined according to ASTM D648 using a testing stress of 0.45 MPa and a sample thickness of 3.2 millimeters (mm).

In some embodiments, the composition can have a flame retardancy that is greater than that of the corresponding composition without the poly(etherimide-siloxane).

In some embodiments, the composition exhibits at least one of the above properties. In some embodiments, the composition exhibits at least two of the above properties. In some embodiments, the composition exhibits each of the above properties.

For example, in a specific embodiment, the thermoplastic composition comprises 45 to 55 wt % of the poly(phthalamide); 45 to 55 wt % of the poly(etherimide-siloxane); and 1 to 4 wt % of the additive composition. Preferably, no poly(etherimide) other than the poly(etherimide-siloxane) is present in the composition. The composition exhibits a notched Izod impact strength of 125 to 350 J/m, as determined by ASTM D256 at 23° C. at a thickness of 3.2 mm and a heat deflection temperature of 100 to 250° C., as determined according to ASTM D648 using a testing stress of 0.45 MPa and a sample thickness of 3.2 mm.

The thermoplastic composition can be manufactured by various methods according to techniques which are known. The compositions described herein can generally be prepared by melt-mixing the components using known methods. Optionally, the composition can be extruded, quenched in a water bath, and pelletized. The pellets so prepared can be one-fourth inch long or less as desired. Such pellets can be used for subsequent molding, shaping, or forming.

The compositions of the present disclosure can be formed into articles using any suitable techniques, for example, melt-processing techniques. Commonly used melt-molding methods can include injection molding, extrusion molding, blow molding, rotational molding, coining, and injection blow molding. For example, the melt molding method can be injection molding. The compositions of the present disclosure can be formed into sheets and both cast and blown films by extrusion. These films and sheets can be further thermoformed into articles and structures that can be oriented from the melt or at a later stage in the processing of the composition. The compositions can be over-molded onto an article made from a different material and/or by a different process. The articles can also be formed using techniques such as compression molding or ram extruding. The articles can be further formed into other shapes by machining. Exemplary articles include fibers, films, sheets, pipes, coatings, or molded parts. In some embodiments, the article can advantageously be a flexible article. In some embodiments, the thermoplastic compositions can be particularly useful for electronics applications. For example, the article can be an electronic device, a component of an electronic device, a wire, a cable, a wearable electronic device, a portable electronic device, a flexible laminate, a flexible display, or a lighting component.

The thermoplastic compositions disclosed herein comprise a poly(phthalamide), a poly(etherimide-siloxane), and, optionally, an additive composition, which yields compositions having a desirable combination of properties including good heat resistance and ductility. Therefore, a substantial improvement in poly(etherimide-siloxane)/poly(phthalamide) compositions is provided.

This disclosure is further illustrated by the following examples, which are non-limiting.

EXAMPLES

Materials for the following examples are listed in Table 1.

TABLE 1

| Component | Description | Source |
| --- | --- | --- |
| PEI-Si-1 | Poly(etherimide-dimethylsiloxane) copolymer, PEI units derived from phenylene diamine and BPA-dianhydride, siloxane content 40 wt % (SILTEM) | SABIC |
| PEI-Si-2 | Poly(etherimide-dimethylsiloxane) copolymer, PEI units derived from phenylene diamine and BPA-dianhydride, siloxane content 20 wt % (SILTEM) | SABIC |
| PEI | Poly(etherimide) comprising structural units derived from phenylene diamine and BPA-dianhydride, available as ULTEM 1010 | SABIC |
| PPA/PA | Blend of poly(phthalamide) comprising structural units derived from a $C_{10}$ diamine and terephthalic acid and polyamide 11 (PA11), non-filled, available as RILSAN HT CMNO TL | Arkema |
| PA10, 10 | Polyamide 10, 10, available as Hiprolon 200 NN | Arkema |
| PA9T-1 | Semiaromatic polyamide comprising structural units derived from a $C_9$ diamine and terephthalic acid, having a melting point of about 304° C. available as Genestar, grade GC 61210 | Kuraray |
| PA9T-2 | Semiaromatic polyamide comprising structural units derived from a $C_9$ diamine and terephthalic acid, having a melting point of about 264° C. available as Genestar, grade GC48020 | Kuraray |
| MD1024 | 2',3-bis[[3-[3,5-di-tert-butyl-4-hydroxyphenyl]propionyl]]propionohydrazide (Irganox MD1024, metal deactivator) | BASF |
| AO-1 | Benzenepropanoic acid, 3,5-bis(1,1-dimethylethyl)-4-hydroxy-, 1,1'-[2,2-bis[[3-[3,5-bis(1,1-dimethylethyl)-4-hydroxyphenyl]-1-oxopropoxy]methyl]-1,3-propanediyl] ester (IRGANOX 1010, hindered phenol stabilizer) | BASF |
| AO-2 | Tris(2,4-di-tert-butylphenyl)phosphite (IRGAPHOS 168, stabilizer) | BASF |
| PETS | Pentaerythritol tetrastearate | FACI ASIA PACIFIC. |
| AO-3 | Octadecyl 3-(3,5-di-tert-butyl-4-hydroxyphenyl)propionate (IRGANOX 1076) | CIBA |
| ADR-1 | Epoxy-functionalized styrene-acrylate copolymer (Joncryl® ADR 4368; CESA 9900, hydrolytic stabilizer) | BASF |

TABLE 1-continued

| Component | Description | Source |
|---|---|---|
| ADR-2 | Epoxy-functionalized styrene-acrylate copolymer (Joncryl ® ADR 4368CS, hydrolytic stabilizer) | BASF |
| AO-4 | Pentaerythritol tetrakis(3-dodecylthiopropionate) (Seenox 412S) | Shipro Kasei Kaisha |
| AO-5 | N,N'-1,6-hexanediylbis[3,5-bis(1,1-dimethylethyl)-4-hydroxyphenyl]propionamide] (IRGANOX 1098, phenolic antioxidant) | BASF |
| Antistat-1 | Thermoplastic elastomer comprising about 60 wt. % polyethylene oxide and about 40 wt. % polyamide-6, available as PEBAX MH 1657 (antistatic additive) | Arkema |
| Antistat-2 | Polyether ester amide, available as PELESTAT NC 6321 (antistatic additive) | Sanyo Chem. Ind. |
| EMA-g-MAH | Ethylene-methyl acrylate grafted maleic anhydride copolymer (compatibilizer), (LOTADER) | Arkema |
| MAH-g-POE | Maleic anhydride grafted polyolefin (FUSABOND N493) | Dupont |

The compositions of the following examples were prepared by compounding on a Toshiba-37BS twin screw extruder, and chopped into pellets following cooling in a water bath at 80-90° C. Prior to injection molding, the pellets were dried in an oven. The compounding profile used to prepare the composition is shown in Table 2.

TABLE 2

| Parameters | Unit | Set Values |
|---|---|---|
| Zone 1 Temp | ° C. | 50 |
| Zone 2 Temp | ° C. | 150 |
| Zone 3 Temp | ° C. | 250 |
| Zone 4 Temp | ° C. | 300 |
| Zone 5 Temp | ° C. | 310 |
| Zone 6 Temp | ° C. | 310 |
| Zone 7 Temp | ° C. | 310 |
| Zone 8 Temp | ° C. | 310 |
| Zone 9 Temp | ° C. | 310 |
| Zone 10 Temp | ° C. | 310 |
| Zone 11 Temp | ° C. | 310 |
| Die Temp | ° C. | 310 |
| Screw speed | rpm | 400 |
| Throughput | kg/hr | 30 |

Articles suitable for physical testing were prepared by injection molding using a Fanuc S-2000i injection molding machine. The injection molding profile used to prepare the articles is provided in Table 3.

TABLE 3

| Parameters | Unit | Set Values |
|---|---|---|
| Cnd: Pre-drying time | Hour | 4-6 |
| Cnd: Pre-drying temp | ° C. | 120 |
| Zone 1 temp | ° C. | 265 |
| Zone 2 temp | ° C. | 280 |
| Zone 3 temp | ° C. | 300 |
| Nozzle temp | ° C. | 300 |
| Mold temp | ° C. | 100 |
| Screw speed | rpm | 110 |
| Back pressure | kgf/cm$^2$ | 70 |
| Cooling time | s | 20 |
| Injection speed(mm/s) | mm/s | 40-80 |
| Holding pressure | kgf/cm$^2$ | 700 |

Physical testing of the compositions was conducted according to the following test methods and procedures. Unless indicated otherwise, all test standards set forth herein are the test standards in effect as of the year 2015.

Heat deflection temperature (HDT) was determined according to ASTM D648 with 0.45 or 1.8 megapascal stress on 3.2 millimeter-thick specimens.

Notched Izod Impact (NII) testing was performed on 63.5×12.7×3.2 millimeter injection molded bars according to ASTM method D256 at 23° C. using a 5 lb-f hammer.

Tensile testing (e.g., tensile modulus, strength, and elongation) was done according to ASTM D638 at 23° C. and using 50 millimeter per minute speed.

Flexural properties (e.g., flexural modulus and stress) were determined according to ASTM D790 using a test speed of 12.5 millimeters per minute and a 3.2 millimeter-thick test sample.

Shore D Hardness was determined according to ASTM D2240 using color chips having dimensions of 80×50×3.2 millimeters.

For each of the following examples, the polymer components and any additives were melt-mixed in the amounts shown in Table 4, extruded, and the resulting compositions were characterized as described above. Physical testing results are also shown in Table 4. Specific examples are discussed below.

TABLE 4

| | Unit | CE1 | CE2 | CE3 | CE4 | CE5 | E1 | E2 | E3 | E4 | E5 | E6 | E7 | E8 | E9 |
|---|---|---|---|---|---|---|---|---|---|---|---|---|---|---|---|
| Component | | | | | | | | | | | | | | | |
| PEI-Si-1 | % | | | 20 | | | 47.5 | | 47.5 | 46.5 | 46.5 | 46.5 | 46.5 | 46.5 | |
| PEI-Si-2 | % | | | | | | | 47.5 | | | | | | | 49.805 |
| PEI | % | 30 | 40 | 20 | 40 | 50 | | | | | | | | | |
| PPA/PA | % | 70 | 60 | 60 | 50 | 50 | | | | | | | | | 49.805 |
| PA10,10 | % | | | | 10 | | | | | | | | | | |
| PA9T-1 | % | | | | | | 50 | 50 | | 50 | 50 | 50 | 50 | 50 | |
| PA9T-2 | % | | | | | | | | 50 | | | | | | |
| MD-1024 | % | | | | | | 0.5 | 0.5 | 0.5 | 0.5 | 0.5 | 0.5 | 0.5 | 0.5 | |
| AO-1 | % | | | | | | 0.5 | 0.5 | 0.5 | 0.5 | 0.5 | 0.5 | 0.5 | 0.5 | |
| AO-2 | % | | | | | | 0.25 | 0.25 | 0.25 | 0.25 | 0.25 | 0.25 | 0.25 | 0.25 | 0.08 |

TABLE 4-continued

| | Unit | CE1 | CE2 | CE3 | CE4 | CE5 | E1 | E2 | E3 | E4 | E5 | E6 | E7 | E8 | E9 |
|---|---|---|---|---|---|---|---|---|---|---|---|---|---|---|---|
| PETS | % | | | | | | | | | | | | | | 0.27 |
| AO-3 | % | | | | | | | | | | | | | | 0.04 |
| ADR-1 | % | | | | | | 0.5 | 0.5 | 0.5 | 0.5 | 0.5 | 0.5 | 0.5 | 0.5 | |
| ADR-2 | % | | | | | | | | | | | | | 1 | |
| AO-4 | % | | | | | | 0.5 | 0.5 | 0.5 | 0.5 | 0.5 | 0.5 | 0.5 | 0.5 | |
| AO-5 | % | | | | | | 0.25 | 0.25 | 0.25 | 0.25 | 0.25 | 0.25 | 0.25 | 0.25 | |
| Antistat-1 | % | | | | | | | | | 1 | | | | | |
| Antistat-2 | % | | | | | | | | | | 1 | | | | |
| EMA-g-MAH | % | | | | | | | | | | | 1 | | | |
| MAH-g-POE | % | | | | | | | | | | | | 1 | | |
| Properties | | | | | | | | | | | | | | | |
| Specific Gravity | | 1.138 | 1.15 | 1.131 | 1.148 | | | | | | | | | | |
| Flex. Modulus | MPa | 2240 | 2330 | 1290 | 2220 | 2430 | 1310 | 2250 | 1070 | 1430 | 1430 | 1420 | 1350 | 1400 | 1910 |
| Flex. Str. at yield | MPa | 91.2 | 94.5 | 56.2 | 86.4 | | | | | | | | | | |
| HDT, 0.45 MPa | °C. | | | | | | 126 | 171 | 100 | 191 | 220 | 209 | 161 | 152 | |
| HDT 1.82 MPa | °C. | 65.1 | 66.6 | 55.9 | 53.5 | 77.4 | | | | | | | | | 79.9 |
| NII, 23° C. | J/m | 42.3 | 46.7 | 41.8 | 43.7 | 59.5 | 301 | 125 | 257 | 97.1 | 99.6 | 195 | 133 | 124 | 64.1 |
| NII, −30° C. | J/m | 41.9 | 46.6 | 40.5 | 37.1 | 58.8 | 188 | 110 | 135 | 61.7 | 60.3 | 74.2 | 81.1 | 95.2 | 13.2 |
| Tensile Modulus | MPa | 2340 | 2374.4 | 1485.8 | 2343.8 | 2461.8 | 1383.4 | 2212.4 | 1138.6 | 1516.4 | 1517 | 1501.8 | 1511.8 | 1569.2 | 1892.6 |
| Tensile Str. at break | MPa | 59.6 | 55 | 38.2 | 53.1 | 72 | 40.2 | 58.8 | 35.8 | 43.2 | 41.7 | 40.7 | 42.8 | 43.7 | 59.6 |
| Tensile Elong. at break | % | 2.84 | 2.48 | 4.33 | 2.43 | 6.34 | 32.99 | 15.91 | 13.89 | 14.21 | 8.33 | 7.42 | 12.95 | 8.63 | 4.41 |
| Shore D, 6.4 mm | | | | | | | 75.8 | 81.7 | 73.6 | 75.8 | 75.6 | 74.9 | 74.8 | 75.9 | |
| Shore D, 3.2 mm | | | | | | 79.9 | | | | | | | | | 79.2 |

As illustrated by Comparative Examples 1-5, compositions comprising poly(etherimide) and poly(amide) were unable to achieve the desired balance of properties. Specifically, the compositions according to CE1-CE5 did not exhibit the desired balance between heat performance and ductility.

In contrast, the compositions according to Examples 1-9, which include a poly(etherimide-siloxane) and a poly(phthalamide), exhibited excellent notched impact performance with lower heat deflection temperature and tensile stress and modulus. Specifically, each of Examples 1-9 exhibited a notched Izod impact strength of greater than 60 J/m at 23° C. Examples 1-3 and 6-8 each exhibited notched Izod impact strengths of greater than 100 J/m at 23° C. Examples 1-8 exhibited heat deflection temperatures of greater than 100° C. using a testing stress of 0.45 MPa and a sample thickness of 3.2 mm. The inventive Examples also advantageously exhibited good tensile properties, including tensile moduli of 1000 to 2500 MPa, tensile strength at break of 35 to 60 MPa, and tensile elongation at break of 4 to 33%. In contrast, the Comparative Example formulations exhibited lower HDT of 50 to 80° C. using a testing stress of 1.82 MPa and a sample thickness of 3.2 mm, lower notched Izod impact strength at 23° C. of 40 to 60 J/m and tensile elongation at break of 2 to 4.5%.

Figure 2:
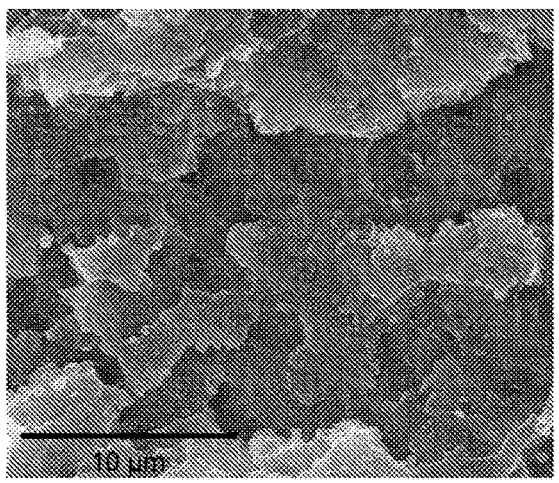
FIG. 2 is a SEM image of the composition of Example 2.
Figure 3:
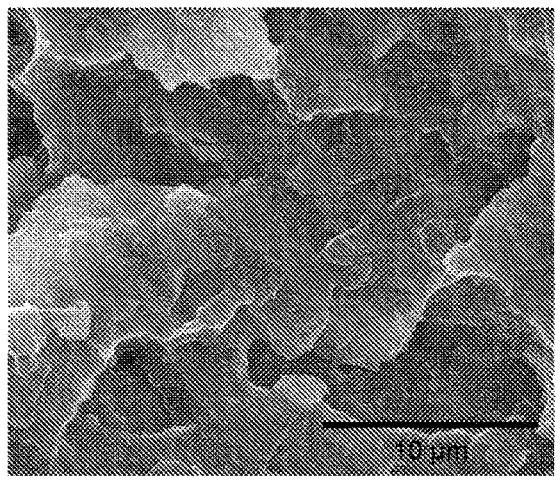
FIG. 3 is a SEM image of the composition of Example 3.
Figure 4:
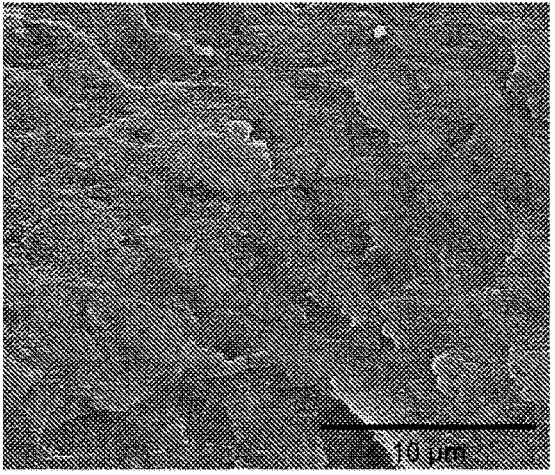
FIG. 4 is a SEM image of the composition of Example 4.
Figure 5:
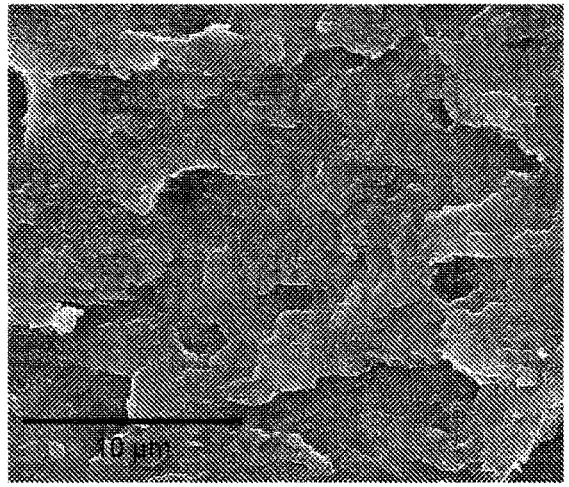
FIG. 5 is a SEM image of the composition of Example 5.
Figure 6:
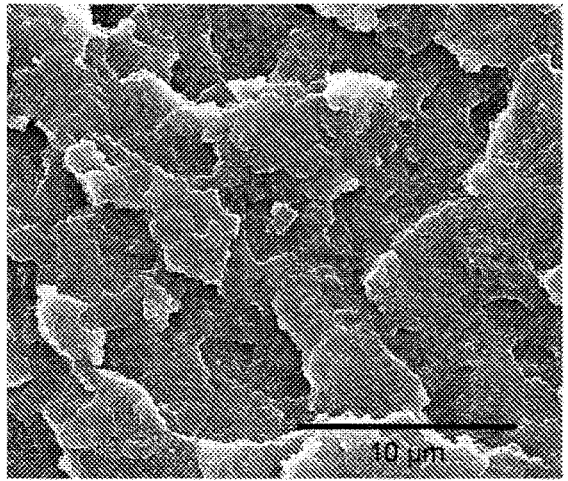
FIG. 6 is a SEM image of the composition of Example 6.
Figure 7:
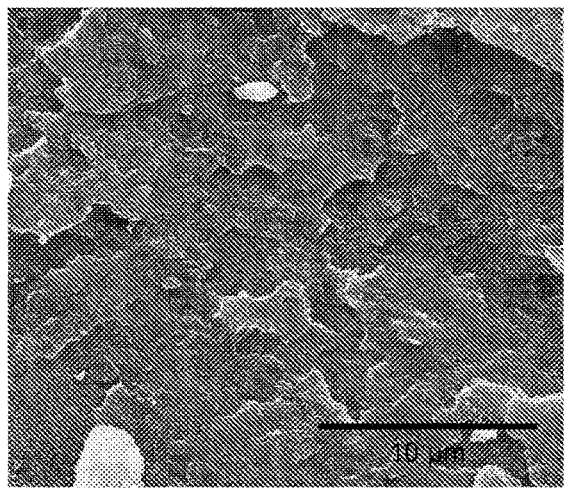
FIG. 7 is a SEM image of the composition of Example 7.
Figure 8:
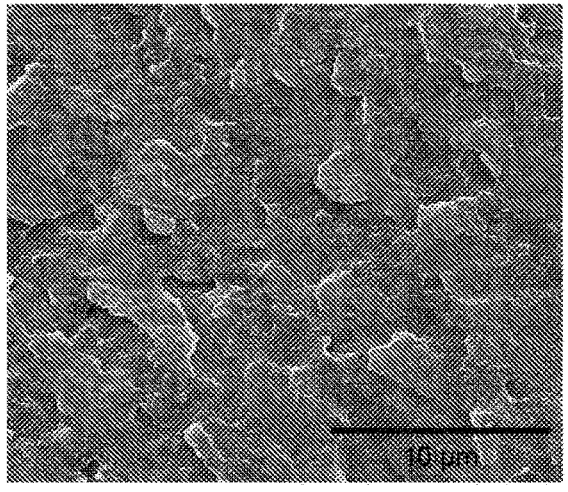
FIG. 8 is a SEM image of the composition of Example 8.

Scanning electron microscopy (SEM) was used to visually evaluate the compatibility of the compositions comprising poly(etherimide-siloxane) and a poly(amide) (PA-9T). The SEM images for inventive examples 1-8 are shown in FIGS. 1-8, respectively. As can be seen from the SEM images, each of the inventive compositions demonstrate good compatibility of the poly(etherimide-siloxane) and the poly(phthalamide) in the blend.

Accordingly, by selecting suitable poly(etherimide-siloxane)/poly(phthalamide) blends, the resulting compositions can achieve a desirable combination of properties, including heat performance and ductility.

The compositions, articles, and methods described herein are further illustrated by the following embodiments.

Embodiment 1: A thermoplastic composition, comprising 10 to 90 wt % of a poly(phthalamide); 10 to 90 wt % of a poly(etherimide-siloxane); and 0 to 10 wt % of an additive composition, wherein weight percent of each component is based on the total weight of the composition.

Embodiment 2: The thermoplastic composition of embodiment 1, wherein the poly(phthalamide) comprises repeating units of the formula

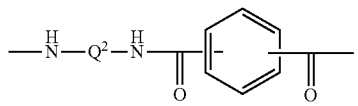

wherein $Q^2$ is independently at each occurrence a substituted or unsubstituted $C_{4-14}$ alkylene group.

Embodiment 3: The thermoplastic composition of embodiments 1 or 2, wherein $Q^2$ is derived from an aliphatic diamine, preferably wherein the aliphatic diamine is a linear $C_{4-14}$ aliphatic diamine, a branched $C_{4-14}$ aliphatic diamine, a $C_{4-14}$ alicyclic diamine, or combination comprising at least one of the foregoing.

Embodiment 4: The thermoplastic composition of embodiment 3, wherein the linear $C_{4-14}$ aliphatic diamine comprises 1,4-butanediamine, 1,6-hexamethylenediamine, 1,8-octamethylenediamine, 1,9-nonamethylenediamine, 1,10-decanediamine, 1,11-undecanediamine, 1,12-dodecanediamine, or a combination comprising at least one of the foregoing; the branched aliphatic diamine comprises 2-methyl-1,5-pentamethylenediamine, 3-methyl-1,5-pentamethylenediamine, 2,4-dimethyl-1,6-hexamethylenediamine, 2,2,4-trimethyl-1,6-hexamethylenediamine, 2,4,4-trimethyl-1,6-hexamethylenediamine, 2-methyl-1,8-octamethylenediamine, 5-methyl-1,9-nonamethylenediamine, or a combination comprising at least one of the foregoing; and the alicyclic diamine comprises cyclohexanediamine, 4,4'-diamino dicyclohexyl methane, or a combination comprising at least one of the foregoing.

Embodiment 5: The thermoplastic composition of any one or more of embodiments 1 to 4, wherein the poly(etherimide-siloxane) comprises units of the formula

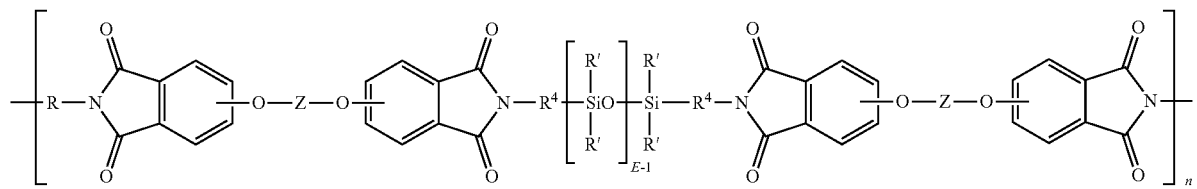

wherein each R is a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing; each $R^4$ is independently a $C_2$-$C_{20}$ alkylene group; each R' is independently a $C_{1-13}$ monovalent hydrocarbyl group; each Z is independently an aromatic $C_{6-24}$ monocyclic or polycyclic group optionally substituted with 1 to 6 $C_{1-8}$ alkyl groups, 1-8 halogen atoms, or a combination comprising at least one of the foregoing; E is 2 to 50; and n is an integer from 2 to 500, preferably 5 to 200, more preferably 10 to 100.

Embodiment 6: The thermoplastic composition of embodiment 5, wherein each R is independently a divalent group of the formula

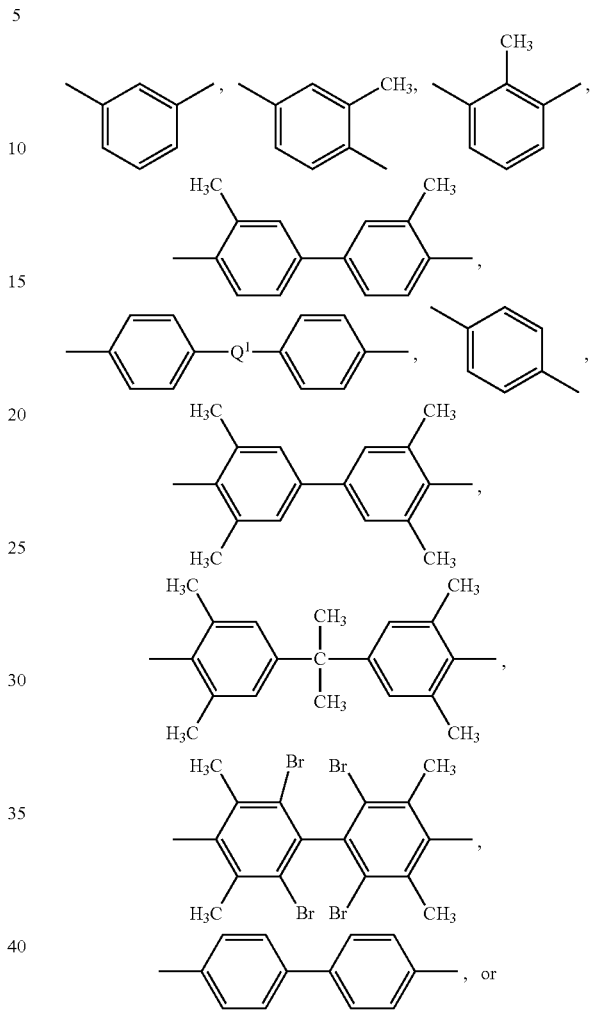

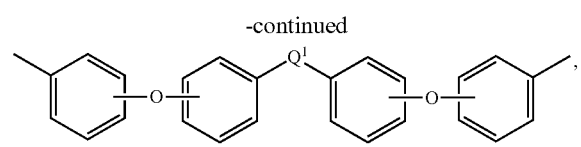

wherein $Q^1$ is —O—, —S—, —C(O)—, —SO$_2$—, —SO—, —P($R^a$)(=O)— wherein $R^a$ is a $C_{1-8}$ alkyl or $C_{6-12}$ aryl, —$C_yH_{2y}$— or a halogenated derivative thereof wherein y is an integer from 1 to 5, or —($C_6H_{10}$)$_z$— wherein z is an integer from 1 to 4; and Z is a group of the formula

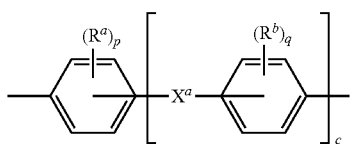

wherein $R^a$ and $R^b$ are each independently a halogen atom or a monovalent $C_{1-6}$ alkyl group, p and q are each independently integers of 0 to 4, c is 0 to 4, and $X^a$ is a single bond, —O—, —S—, —S(O)—, —SO$_2$—, —C(O)—, or a $C_{1-18}$ organic bridging group; preferably wherein each R is independently meta-phenylene, para-phenylene, bis(4,4'-phenylene)sulfonyl, or a combination comprising at least one of the foregoing, and each Z is 4,4'-diphenylene isopropylidene.

Embodiment 7: The thermoplastic composition of any one or more of embodiments 1 to 6, wherein the additive composition comprises a filler, reinforcing agent, antioxidant, heat stabilizer, light stabilizer, ultraviolet light stabilizer, ultraviolet light absorbing additive, plasticizer, lubricant, release agent, processing aid, antistatic agent, anti-fog agent, antimicrobial agent, colorant, surface effect additive, radiation stabilizer, flame retardant, anti-drip agent, hydrostabilizer, or a combination comprising at least one of the foregoing, preferably, an antioxidant, heat stabilizer, hydrostabilizer, ultraviolet light stabilizer, processing aid, colorant, or a combination comprising at least one of the foregoing.

Embodiment 8: The thermoplastic composition of any one or more of embodiments 1 to 7, wherein the composition comprises 40 to 60 wt %, preferably 45 to 55 wt % of the poly(phthalamide); 40 to 60 wt %, preferably 45 to 55 wt % of the poly(etherimide-siloxane); and greater than 0 to 10 wt % of the additive composition, preferably 0.1 to 5 wt %, more preferably 0.25 to 4 wt %, even more preferably 1 to 4 wt %.

Embodiment 9: The thermoplastic composition of any one or more of embodiments 1 to 8, wherein the composition exhibits a notched Izod impact strength of greater than or equal to 95 J/m, preferably 95 to 350 J/m, more preferably 100 to 350 J/m, even more preferably 125 to 350 J/m, as determined by ASTM D256 at 23° C. at a thickness of 3.2 mm.

Embodiment 10: The thermoplastic composition of any one or more of embodiments 1 to 9, wherein the composition exhibits a heat deflection temperature of greater than or equal to 100° C., preferably 100 to 250° C., as determined according to ASTM D648 using a testing stress of 0.45 MPa and a sample thickness of 3.2 mm.

Embodiment 11: The thermoplastic composition of any one or more of embodiments 1 to 10, wherein the composition exhibits a greater flame retardancy compared to the same composition without the polyetherimide-siloxane.

Embodiment 12: The thermoplastic composition of any one or more of embodiments 1 to 11, wherein the composition comprises 45 to 55 wt % of the poly(phthalamide); 45 to 55 wt % of the poly(etherimide-siloxane); and 1 to 4 wt % of the additive composition; and wherein the composition exhibits a notched Izod impact strength of 125 to 350 J/m, as determined by ASTM D256 at 23° C. at a thickness of 3.2 mm; and a heat deflection temperature of 100 to 250° C., as determined according to ASTM D648 using a testing stress of 0.45 MPa and a sample thickness of 3.2 mm.

Embodiment 13: The thermoplastic composition of any one or more of embodiments 1 to 12, wherein a poly (etherimide) other than the poly(etherimide-siloxane) is excluded from the composition.

Embodiment 14: An article comprising the thermoplastic composition of any one or more of embodiments 1 to 13.

Embodiment 15: The article of embodiment 14, wherein the article is an injection molded article, an extruded article, or a compression molded article.

Embodiment 16: The article of embodiments 14 or 15, wherein the article is a fiber, a film, a sheet, a pipe, a coating, or a molded part.

Embodiment 17: The article of any one or more of embodiments 14 to 16, wherein the article is a flexible article.

Embodiment 18: The article of any one or more of embodiments 14 to 17, wherein the article is a component of a consumer electronic device, a wire, a cable, a wearable electronic device, a flexible laminate, a flexible display, or a lighting component.

Embodiment 19: A method for the manufacture of the thermoplastic composition of any one or more of embodiments 1 to 13, the method comprising, melt-mixing the components of the composition; and optionally, extruding the composition.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl)a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A thermoplastic composition, comprising
   40 to 60 wt % of a poly(phthalamide);
   40 to 60 wt % of a poly(etherimide-siloxane); and
   greater than 0 to 10 wt % of an additive composition,
   wherein weight percent of each component is based on the total weight of the composition.

2. The thermoplastic composition of claim 1, wherein the poly(phthalamide) comprises repeating units of the formula

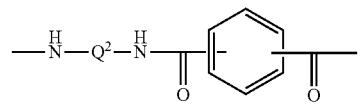

wherein Q$^2$ is independently at each occurrence a substituted or unsubstituted C$_{4-14}$ alkylene group.

3. The thermoplastic composition of claim 1, wherein Q$^2$ is derived from an aliphatic diamine.

4. The thermoplastic composition of claim 3, wherein the aliphatic diamine is a linear C$_{4-14}$ aliphatic diamine, a branched C$_{4-14}$ aliphatic diamine, a C$_{4-14}$ alicyclic diamine, or combination comprising at least one of the foregoing; and
   the linear C$_{4-14}$ aliphatic diamine comprises 1,4-butanediamine, 1,6-hexamethylenediamine, 1,8-octamethylenediamine, 1,9-nonamethylenediamine, 1,10-decanediamine, 1,11-undecanediamine, 1,12-dodecanediamine, or a combination comprising at least one of the foregoing;
   the branched aliphatic diamine comprises 2-methyl-1,5-pentamethylenediamine, 3-methyl-1,5-pentamethylenediamine, 2,4-dimethyl-1,6-hexamethylenediamine, 2,2,4-trimethyl-1,6-hexamethylenediamine, 2,4,4-trimethyl-1,6-hexamethylenediamine, 2-methyl-1,8-octamethylenediamine, 5-methyl-1,9-nonamethylenediamine, or a combination comprising at least one of the foregoing; and
   the alicyclic diamine comprises cyclohexanediamine, 4,4'-diamino dicyclohexyl methane, or a combination comprising at least one of the foregoing.

5. The thermoplastic composition of claim 1, wherein the poly(etherimide-siloxane) comprises units of the formula

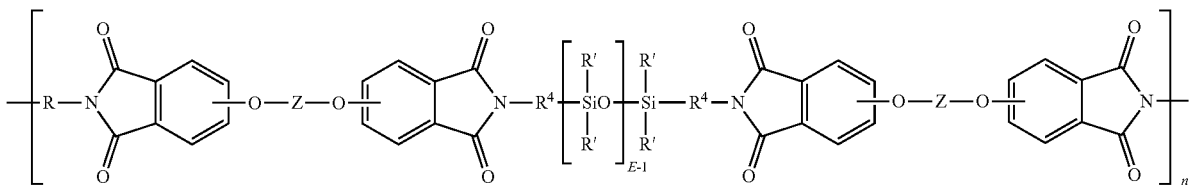

wherein
   each R is a substituted or unsubstituted C$_{6-20}$ aromatic hydrocarbon group, a substituted or unsubstituted, straight or branched chain C$_{4-20}$ alkylene group, a substituted or unsubstituted C$_{3-8}$ cycloalkylene group, or a combination comprising at least one of the foregoing;
   each R$^4$ is independently a C$_2$-C$_{20}$ alkylene group;
   each R' is independently a C$_{1-13}$ monovalent hydrocarbyl group;
   each Z is independently an aromatic C$_{6-24}$ monocyclic or polycyclic group optionally substituted with 1 to 6 C$_{1-8}$ alkyl groups, 1-8 halogen atoms, or a combination comprising at least one of the foregoing;
   E is 2 to 50; and
   n is an integer from 2 to 500.

6. The thermoplastic composition of claim 5, wherein each R is independently a divalent group of the formula

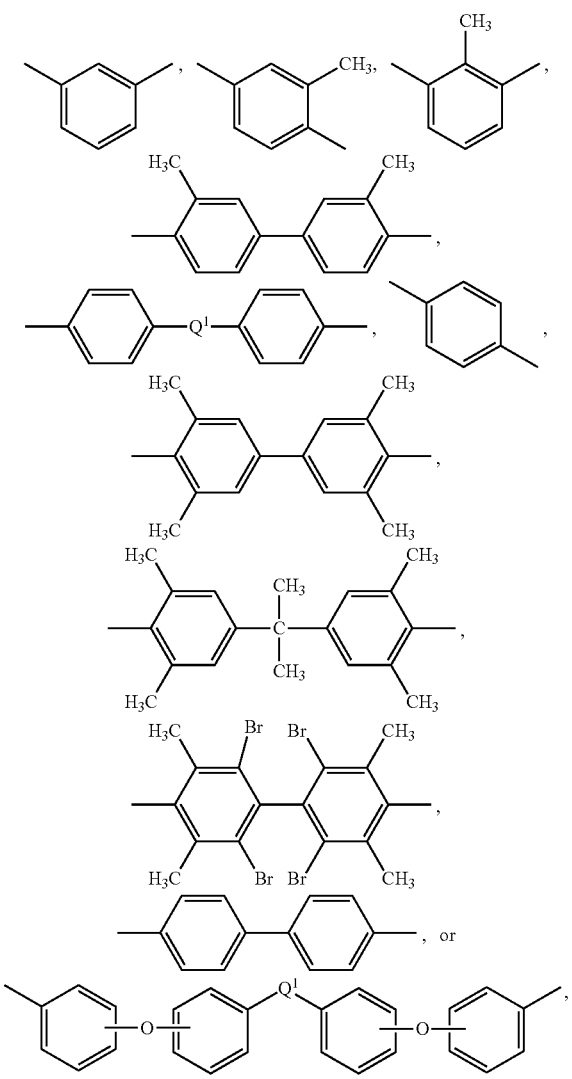

wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —$C_yH_{2y}$— or a halogenated derivative thereof wherein y is an integer from 1 to 5, or —(C$_6$H$_{10}$)$_z$— wherein z is an integer from 1 to 4; and Z is a group of the formula

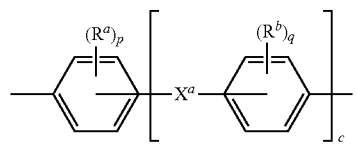

wherein

R$^a$ and R$^b$ are each independently a halogen atom or a monovalent $C_{1-6}$ alkyl group, p and q are each independently integers of 0 to 4, c is 0 to 4, and X$^a$ is a single bond, —O—, —S—, —S(O)—, —SO$_2$—, —C(O)—, or a $C_{1-18}$ organic bridging group.

7. The thermoplastic composition of claim 1, wherein the additive composition comprises
a filler, reinforcing agent, antioxidant, heat stabilizer, light stabilizer, ultraviolet light stabilizer, ultraviolet light absorbing additive, plasticizer, lubricant, release agent, processing aid, antistatic agent, anti-fog agent, antimicrobial agent, colorant, surface effect additive, radiation stabilizer, flame retardant, anti-drip agent, hydrostabilizer, or a combination comprising at least one of the foregoing.

8. The thermoplastic composition of claim 1, wherein the composition comprises
45 to 55 wt % of the poly(phthalamide);
45 to 55 wt % of the poly(etherimide-siloxane); and
0.1 to 5 wt % of the additive composition.

9. The thermoplastic composition of claim 1, wherein the composition exhibits a notched Izod impact strength of greater than or equal to 95 J/m, as determined by ASTM D256 at 23° C. at a thickness of 3.2 mm.

10. The thermoplastic composition of claim 1, wherein the composition exhibits a heat deflection temperature of greater than or equal to 100° C., as determined according to ASTM D648 using a testing stress of 0.45 MPa and a sample thickness of 3.2 mm.

11. The thermoplastic composition of claim 1, wherein the composition exhibits a greater flame retardancy compared to the same composition without the poly(etherimide-siloxane).

12. The thermoplastic composition of claim 1, wherein the composition comprises
45 to 55 wt % of the poly(phthalamide);
45 to 55 wt % of the poly(etherimide-siloxane); and
1 to 4 wt % of the additive composition; and
wherein
the composition exhibits a notched Izod impact strength of 125 to 350 J/m, as determined by ASTM D256 at 23° C. at a thickness of 3.2 mm; and
a heat deflection temperature of 100 to 250° C., as determined according to ASTM D648 using a testing stress of 0.45 MPa and a sample thickness of 3.2 mm.

13. The thermoplastic composition of claim 1, wherein a poly(etherimide) other than the poly(etherimide-siloxane) is excluded from the composition.

14. An article comprising the thermoplastic composition of claim 1.

15. The article of claim 14, wherein the article is an injection molded article, an extruded article, or a compression molded article.

16. The article of claim 14, wherein the article is a fiber, a film, a sheet, a pipe, a coating, or a molded part.

17. The article of claim 14, wherein the article is a flexible article.

18. The article of claim 14, wherein the article is a component of a consumer electronic device, a wire, a cable, a wearable electronic device, a flexible laminate, a flexible display, or a lighting component.

19. A method for the manufacture of the thermoplastic composition of claim 1, the method comprising,
melt-mixing the components of the composition; and
optionally, extruding the composition.

* * * * *